(12) United States Patent
Pitwon et al.

(10) Patent No.: US 7,625,134 B2
(45) Date of Patent: Dec. 1, 2009

(54) OPTICAL CONNECTOR, A COMMUNICATION SYSTEM AND A METHOD OF CONNECTING A USER CIRCUIT TO AN OPTICAL TRANSCEIVER

(75) Inventors: Richard Charles Pitwon, Fareham (GB); Kenneth McPherson Hopkins, Chichester (GB)

(73) Assignee: Xyratex Technology Limited, Havant, Hampshire (GB)

( * ) Notice: Subject to any disclaimer, the term of this patent is extended or adjusted under 35 U.S.C. 154(b) by 0 days.

(21) Appl. No.: 11/915,111

(22) PCT Filed: May 30, 2006

(86) PCT No.: PCT/GB2006/001941

§ 371 (c)(1),
(2), (4) Date: Nov. 20, 2007

(87) PCT Pub. No.: WO2006/129069

PCT Pub. Date: Dec. 7, 2006

(65) Prior Publication Data

US 2008/0187320 A1  Aug. 7, 2008
US 2009/0052904 A2  Feb. 26, 2009

Related U.S. Application Data

(60) Provisional application No. 60/686,053, filed on Jun. 1, 2005.

(51) Int. Cl.
G02B 6/36 (2006.01)
(52) U.S. Cl. ................ 385/88; 385/53; 385/92
(58) Field of Classification Search .............. None
See application file for complete search history.

(56) References Cited

U.S. PATENT DOCUMENTS

| 5,091,985 | A |   | 2/1992  | Heidemann |
|-----------|---|---|---------|-----------|
| 5,134,679 | A | * | 7/1992  | Robin et al. ........... 385/90 |
| 5,155,784 | A | * | 10/1992 | Knott ................ 385/88 |
| 5,241,612 | A | * | 8/1993  | Iwama ............... 385/74 |
| 5,446,815 | A | * | 8/1995  | Ota et al. ............ 385/33 |
| 5,896,485 | A | * | 4/1999  | Kirby ............... 385/134 |
| 6,012,852 | A | * | 1/2000  | Kadar-Kallen et al. ..... 385/74 |
| 6,305,848 | B1 |  | 10/2001 | Gregory |
| 6,379,053 | B1 |  | 4/2002  | Van Doorn |

(Continued)

FOREIGN PATENT DOCUMENTS

WO  WO 2006/129069 A1 * 12/2006

*Primary Examiner*—Mike Stahl
(74) *Attorney, Agent, or Firm*—Pillsbury Winthrop Shaw Pittman, LLP

(57) ABSTRACT

The invention provides an optical connector for connecting a user circuit to an optical backplane, in use the connector being adapted for mounting on a user circuit. The connector comprises an active or passive photonic interface through which optical signals may be transmitted and received between a user circuit and a said optical backplane. The connector further is comprised of a primary aligner for engagement with a corresponding aligner on a backplane to ensure alignment of the optical interface with the backplane, and a support for supporting the aligner and/or the optical interface on the connector. The support is selected to enable relative movement between a user circuit to which the connector is connected in use and the aligner and/or the optical interface. The support is preferably a flexible printed circuit board.

15 Claims, 7 Drawing Sheets

U.S. PATENT DOCUMENTS

| | | | |
|---|---|---|---|
| 6,390,690 B1 * | 5/2002 | Meis et al. | 385/88 |
| 7,213,974 B2 | 5/2007 | Kiani | |
| 2002/0106162 A1 * | 8/2002 | Loder et al. | 385/53 |
| 2003/0044127 A1 * | 3/2003 | Roth et al. | 385/88 |
| 2004/0033016 A1 * | 2/2004 | Kropp | 385/31 |
| 2006/0177184 A1 * | 8/2006 | Basavanhally et al. | 385/89 |
| 2007/0286555 A1 | 12/2007 | Kiani | |

* cited by examiner

OPTICAL CONNECTOR, A COMMUNICATION SYSTEM AND A METHOD OF CONNECTING A USER CIRCUIT TO AN OPTICAL TRANSCEIVER

CROSS REFERENCE TO RELATED APPLICATIONS

This is the U.S. National Phase of PCT/GB2006/001941, filed May 30, 2006, which in turn claims priority to U.S. provisional application No. 60/686,053, filed Jun. 1, 2005, the contents of both of which are incorporated herein in their entirety by reference.

The present invention relates to an optical connector, a communication system and a method of connecting a user circuit to an optical backplane.

Optical backplanes are known. An example of such a backplane is described in our co-pending patent application no. U.S. 60/569,626 the entire contents of which are hereby incorporated by reference. As disclosed in U.S. Pat. No. 6,569,626, in use, a number of user circuits are connected to an optical backplane. Communication between the user circuits is achieved by the transmission of optical signals from one circuit to the backplane and then along the backplane and to its desired destination, i.e. one of the other user circuits. It is important that the connection between each of the user circuits and the optical backplane is such that as much as possible of the desired light forming a signal from one of the user circuits is coupled into the optical backplane.

To achieve accurate alignment of the optical transceivers and the backplane to which they are connected, complex adjustment processes are required. Typically a trial and error procedure is used whereby a user circuit is connected to the backplane and the user circuit is then manipulated until a satisfactory quality of signal transmission along the backplane is achieved. This is time consuming and therefore expensive.

There is a need for an optical connector suitable for connecting a user circuit to an optical backplane, the connector being low cost and suitable for Very Short Reach (VSR) optical applications.

According to a first aspect of the present invention, there is provided an optical connector for connecting a user circuit to an optical backplane, in use the connector being adapted for mounting on a user circuit or on a backplane, the connector comprising: an optical interface through which optical signals may be transmitted and received between a user circuit and a said optical backplane; a primary aligner for engagement with a corresponding aligner on a backplane or user circuit to ensure alignment of the optical interface with the backplane or user circuit; and a support for supporting the aligner and/or the optical interface on the connector, the support being selected to enable relative movement between a user circuit or backplane to which the connector is connected in use and the primary aligner and/or the optical interface.

In an embodiment, the invention provides an optical connection system based on the use of an optical interface and an aligner that are movable with respect to the user circuit to which they are connected. In an example, the optical interface and aligner are assembled on a flexible printed circuit board (PCB) material, to allow the active optical components in the user circuit to be mechanically aligned with an optical interface in a receptacle optical system such as an optical backplane. In embodiments, the invention thus exploits the mechanical properties of flexible PCB to accommodate a free-floating active optical component system within a transceiver connector module, such that the module remains rigid with respect to the user circuit on which it is supported, whereas the optical interface and aligner can be free-floating and, mechanically translated into and out of engagement with an interface on the receptacle optical backplane.

Preferably, the connector comprises an optical transceiver on board the connector.

In a particularly preferred embodiment, a connector is provided that makes possible the implementation of optical connection systems between electronic daughter boards and an optical PCB or backplane in a large rack system, without compromising the critical optical alignment requirement inherent to the systems. In other words, the connector is provided such that engagement with a backplane in a way that will ensure good optical communication may be performed simply and manually by an unskilled user.

According to a second aspect of the present invention, there is provided a method of connecting a user circuit to an optical backplane, the method comprising: providing a user circuit having a connector arranged thereon, the connector being a connector according to the first aspect of the present invention; providing an optical backplane having one or more sockets for receiving a connector; engaging the connector within the socket of the backplane.

According to a third aspect of the present invention, there is provided a communication system comprising: an optical backplane for receiving one or more user circuits and enabling optical communication therebetween; one or more user circuits for connection to the optical backplane; and, a connector for connecting the or each user circuit to the optical backplane, wherein the connector is an optical connector according to the first aspect of the present invention.

The flexible optical connector could be mounted on the optical backplane for connection to a user circuit or alternatively mounted on the user circuit for connection to an optical backplane. In each case the corresponding arrangement of plug/socket etc may be configured accordingly.

According to a fourth aspect of the present invention, there is provided an optical transceiver for transmitting light into or receiving light from an optical backplane, the transceiver comprising a light generator or a light sensitive receiver and an optical arrangement for imaging light received from or transmitted to an optical backplane when in use, the optical arrangement comprising a flat lens.

In an embodiment the optical transceiver includes a graded index lens or graded index lens array. Such an arrangement is flat in that it has a flat outer surface. This enables accurate alignment of the lens against another flat surface such as the optical waveguide interface of an optical backplane.

Examples of the present invention will now be described in detail, with reference to the accompanying drawings, in which.

Before describing in detail examples of embodiments of connectors according to one aspect of the present invention it is pointed out that where terms such as "upward", "downward", "up", "down" etc. are used these are in reference to the layout of the examples shown in the Figures. They are clearly not limiting and can be interpreted as relating to relative positions of the components described as shown in the accompanying Figures.

Figure 1:
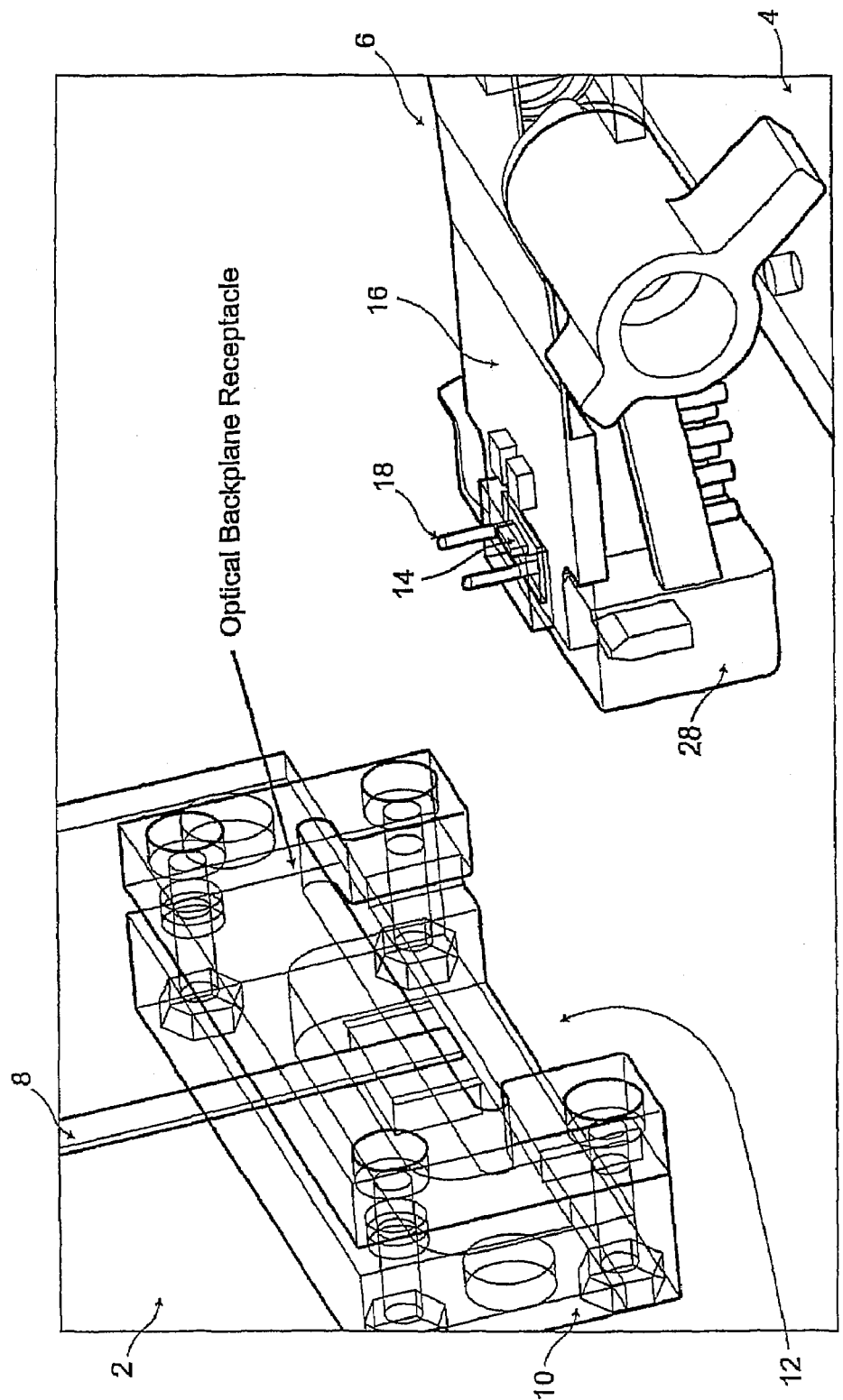
FIG. 1 is a perspective view of an optical connector and an optical backplane for receiving the connector.

FIG. 1 shows a perspective view of part of an optical backplane 2 and part of a user circuit 4 together with a connector 6 coupled to the user circuit 4. The optical backplane includes one or more optical waveguides 8, such as a polymer waveguide, arranged on it. In the example shown, the optical waveguide is within a parallel array of optical waveguides. Other possible waveguide arrangements could be used such as non-parallel, curved, split, cross-over, or any other optical waveguide pattern which supports optical communication.

A mounting 10 is provided connected to the optical backplane 2. The mounting 10 has an opening 12 for receiving one end of the connector 6. The mounting includes or has a space for a waveguide interface (not shown). As will be explained below, the waveguide interface serves to receive optical signals from a user circuit and couple them to the waveguide and vice versa.

The connector 6 will be described in more detail below but generally, it comprises an optical interface, e.g. a photonic interface 14 that in use is aligned with the waveguide or waveguides 8 of the optical backplane 2 to enable optical communication between the photonic interface and the optical backplane 2. It is important to note that in a multiple waveguide arrangement, simultaneous alignment of the parallel optics within the photonic interface may be desired with all the waveguides. The optical interface may be an active or a passive photonic interface for transmitting and receiving light signals.

A housing (not shown) surrounds the components of the connector. The housing is preferably a rigid structure that provides physical protection to the components of the connector. It will be appreciated that the photonic interface 14 is also in communication with a user circuit 4 so that the connector 6 enables communication between the user circuit 4 and the optical backplane 2. Thus, the user circuit 4 is able to communicate with other user circuits that are also connected to the optical backplane 2 by the transmission and reception of optical signals along the waveguide 8.

As will be explained below, the optical interface includes one or more lenses to image or illuminate light passing through it. By providing an imaging lens or lenses optical coupling to a small waveguide is improved as all light is imaged into a small image point.

The opening 12 in the mounting 10 is sized to receive the connector 6 and in particular the distal end of the housing of the connector 6. At the distal end, a locking plug 28 is provided. It is the locking plug 28 that engages with the opening 12 upon connection of a user circuit to the backplane. In the example shown the connector utilises a cam and spring latch mechanism in combination with a flexible PCB substrate, both to lock the connector in place and to manipulate the position of the photonic interface 14. Thus the connector ensures that the photonic interface 14 is in suitable alignment with the optical backplane 2 and the waveguide or waveguides 8 thereon. In combination with the geometry of the connector housing, this enables controlled engagement and disengagement of the photonic interface 14 with the waveguide 8 on the optical backplane.

In the example shown, the connector 6 has a flexible circuit board 16 on which is mounted the photonic interface 14. The housing (not shown) surrounds the components of the connector. The flexible substrate is thus surrounded by the connector housing and is free within limits to move within the housing. The connector includes an aligner referred to herein after as primary alignment device 18. In the example shown in the Figures, the primary alignment device 18 comprises a pair of pins such as standard MT pins that are sized to engage with a pin receiver 19. As shown clearly in FIGS. 3 and 4, the pin receiver has slots 30 dimensioned to receive the pins. Other suitable alignment devices may be used. It is preferred that the pins 18 are shaped to make easier their entry into the slots 30. For example the pins may be chamfered or smoothly tapered at the top, i.e. first point of pin entry. Of course, the pin/socket relationship may be reversed such that pins are provided on the backplane 2 for engagement within sockets in the connector 6. Indeed, any suitable means of alignment may be utilised.

By virtue of the arrangement of the photonic interface 14 on the flexible circuit board 16, the alignment device 18 and the photonic interface 14 is movable with respect to the connector and therefore with respect to the user circuit 4 to which, in use, the connector is mounted. This ensures that the optical connection between the user circuit 4 and the optical backplane 2 can be precisely aligned so as to ensure good communication between the two.

Figure 2:
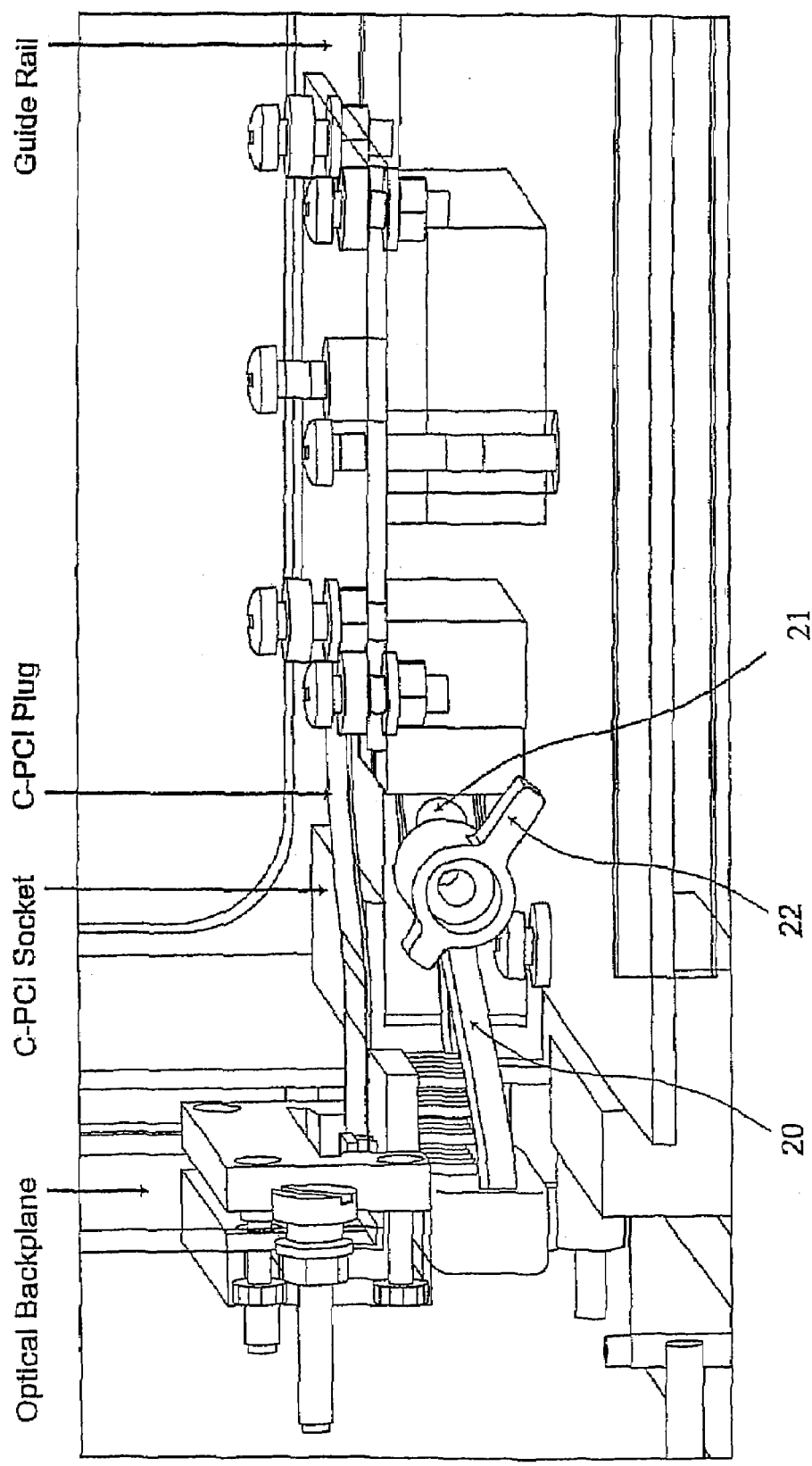
FIG. 2 is a schematic representation showing a user circuit and a connector in engagement with an optical backplane.
Figure 3:
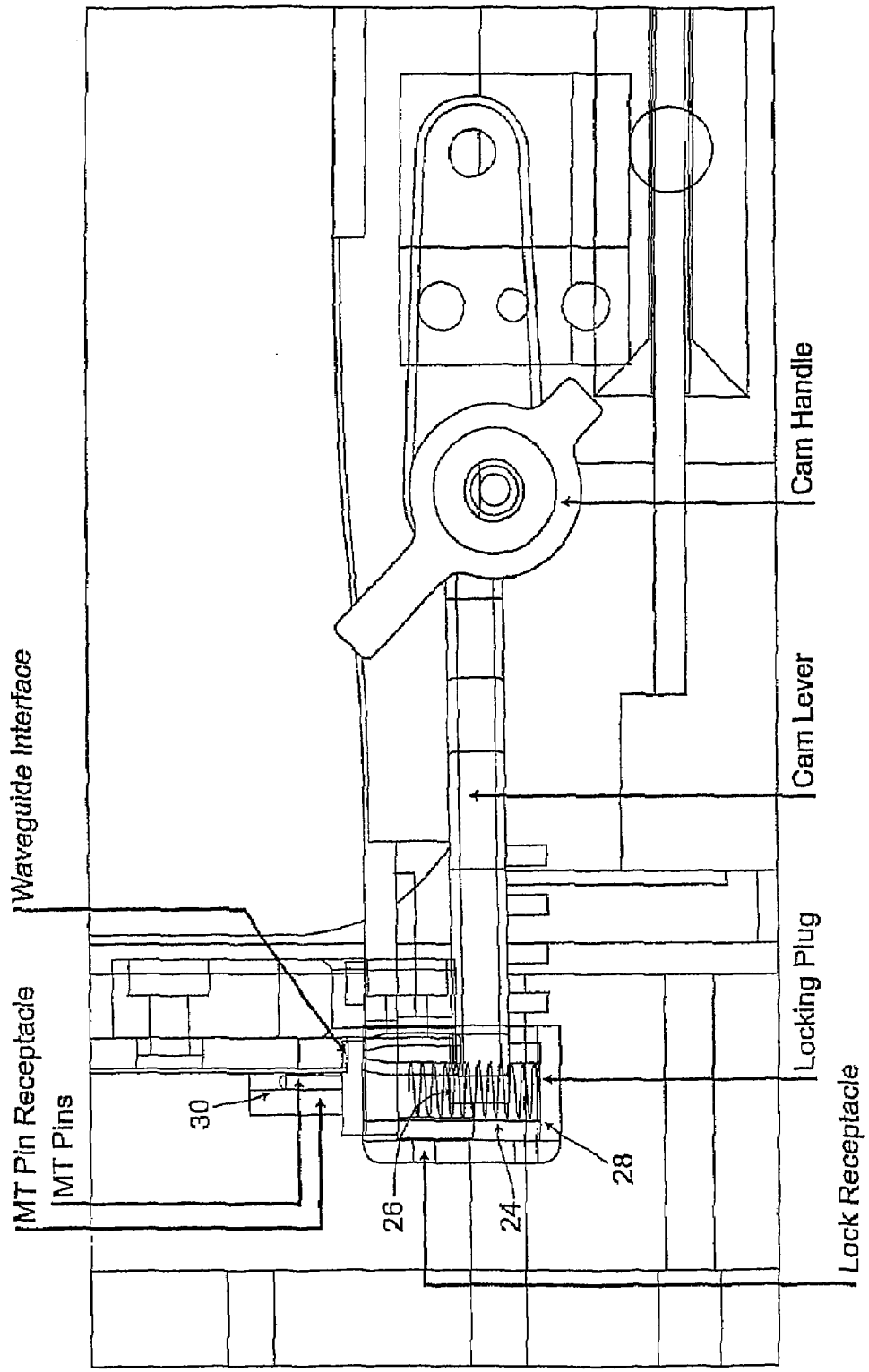
FIG. 3 is a section through an optical connector connecting an optical backplane and a user circuit in a first mode of operation.

With reference to FIG. 2, the example shown therein will now be described in detail. As with the example shown in FIG. 1, the connector 6 includes a flexible circuit board 16. A controller for controlling movement of the flexible circuit board 16 and the photonic interface device 14 is provided. In the example shown in FIGS. 1 to 4, the controller comprises a cam 21 connected both to a cam lever 20 and a cam handle 22. Upon rotation of the cam handle 22 in a counter-clockwise direction (as shown in FIGS. 1 to 3) the cam lever 20 is urged upwards thereby forcing the photonic interface 14 upwards too. Thus, the flexibility of the circuit board 16 must be sufficient to enable the relative movement of the photonic interface 14 with respect to the connector 6 upon activation of the controller (i.e. upon rotation of the cam handle 22).

It will be appreciated that the cam arrangement described above is merely an example of a suitable controller for controlling movement of the flexible circuit board and the photonic interface unit. Any suitable controller may be used. For example, an electromagnetic device may be used.

Referring to FIG. 3, a spring system 24 is provided located generally within the locking plug 28. The spring system 24 includes one or more springs 26. The springs 26 accommodate limited movement of the photonic interface 14 in any direction and over-travel upon mechanical engagement of the photonic interface 14 with the polymer waveguide interface 18 on the optical backplane 2.

Figure 4:
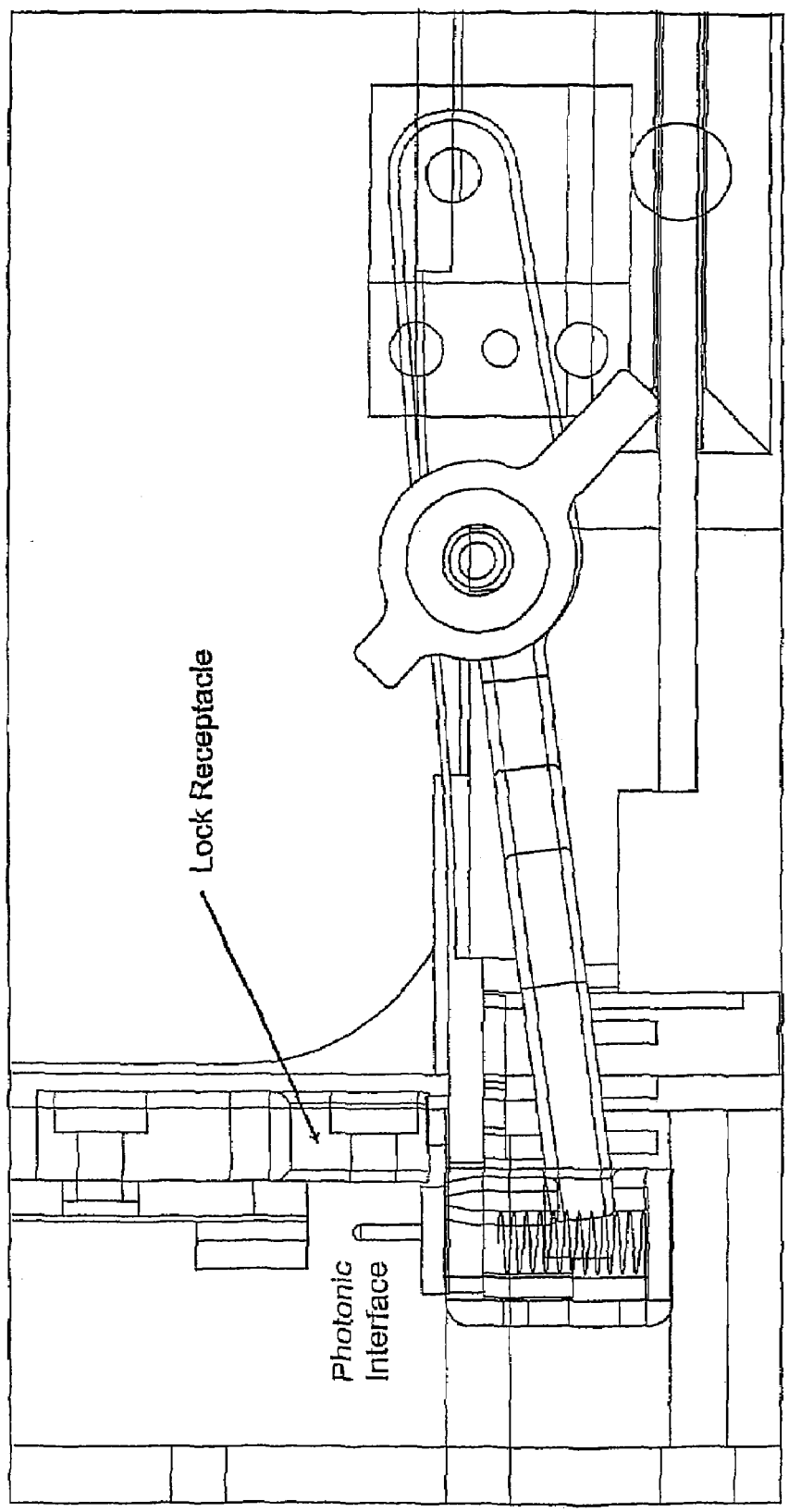
FIG. 4 is a section through the optical connector of FIG. 3 in a second configuration.

The spring system 24 is arranged in engagement with a locking plug 28 shown clearly in FIGS. 3 and 4. In the example shown, the locking plug and all its subsidiary components on the connector are supported by the cam lever 20. As explained above, the cam lever provides the vertical translation that is necessary to bring the photonic interface 14 into registration with the optical backplane receptacle so that optical communication is enabled between the user circuit 4 and the waveguide 8. The cam lever 20 in turn is controlled by the rotation of the user-operated cam handle 22 located on the exterior of the connector housing (not shown).

In the example shown and described so far, the optical interface is a photonic interface including an optical transceiver. It will be appreciated that the optical interface need not include a transceiver. Indeed, the connector could have flexible waveguides arranged thereon to couple light to and from a transceiver arranged elsewhere e.g. on the user circuit.

Referring now to FIGS. 3 and 4, an engagement/disengagement cycle will now be described for the connector. Initially, the connector (connected to a user circuit 4) is brought into engagement with the opening 12 on the optical backplane 2. In other words, the locking plug 28 is forced to mate with the opening 12 in the mounting 10. A secondary aligner or alignment means (the MT pins in this example being the primary aligner or alignment means) are provided to ensure that the connector is in a general position such that engagement between the pins and the sockets is possible. The secondary alignment means may comprise any suitable arrangement such as guide rails. These could be provided on the optical backplane receptacle to enable the correct alignment of the locking plug 28 in the opening 12.

Once the locking plug 28 is in place, the cam handle 22 is operated. In the example shown this is achieved by anti-clockwise rotation of the cam handle. The cam lever 20 is raised, thus raising the locking plug and forcing upward the distal end of the flexible circuit 16 which supports the photonic interface. The locking plug engages further with the locking receptacle 12 on the optical backplane. Then, the alignment means (pins 18 in this example) are guided into the pin receiving slots 30 on the backplane. Thus, the photonic interface is forced into alignment with the waveguide interface of the optical backplane.

In view of the fact that the engagement is guided by the alignment of the pins 18 and the pin receptacles 30, and the locking plug 28 and locking plug receptacle 12, this is not a skilled process. Accordingly, an unskilled user is able correctly to align the optical interface 14 on the connector with the waveguide 8 on the optical backplane. FIG. 3 shows the user circuit engaged with the optical backplane. The cam lever 20 is raised so that the pins 18 are securely located within the pin receptacles 30 on the optical backplane.

Referring now to FIG. 4, the cam handle 22 is again operated. This time it is rotated in a clockwise direction. The pins 18 are disengaged from the pin receptacles 30 on the optical backplane. The locking plug 28 is disengaged from the locking receptacle 12. The user circuit 4 and the connector can now be manually withdrawn from the optical backplane.

The example shown in and described with reference to FIGS. 1 to 4 is one specific example of a connector suitable for enabling the manual alignment of an optical interface 14 with an optical waveguide 8 on an optical backplane 2. It will be appreciated that other suitable devices could be used. It is important that the photonic interface 14 is movable with respect to the user circuit 4. In the examples shown, this is achieved by the provision of a flexible circuit board 16 on which the photonic interface is mounted.

Figure 5:
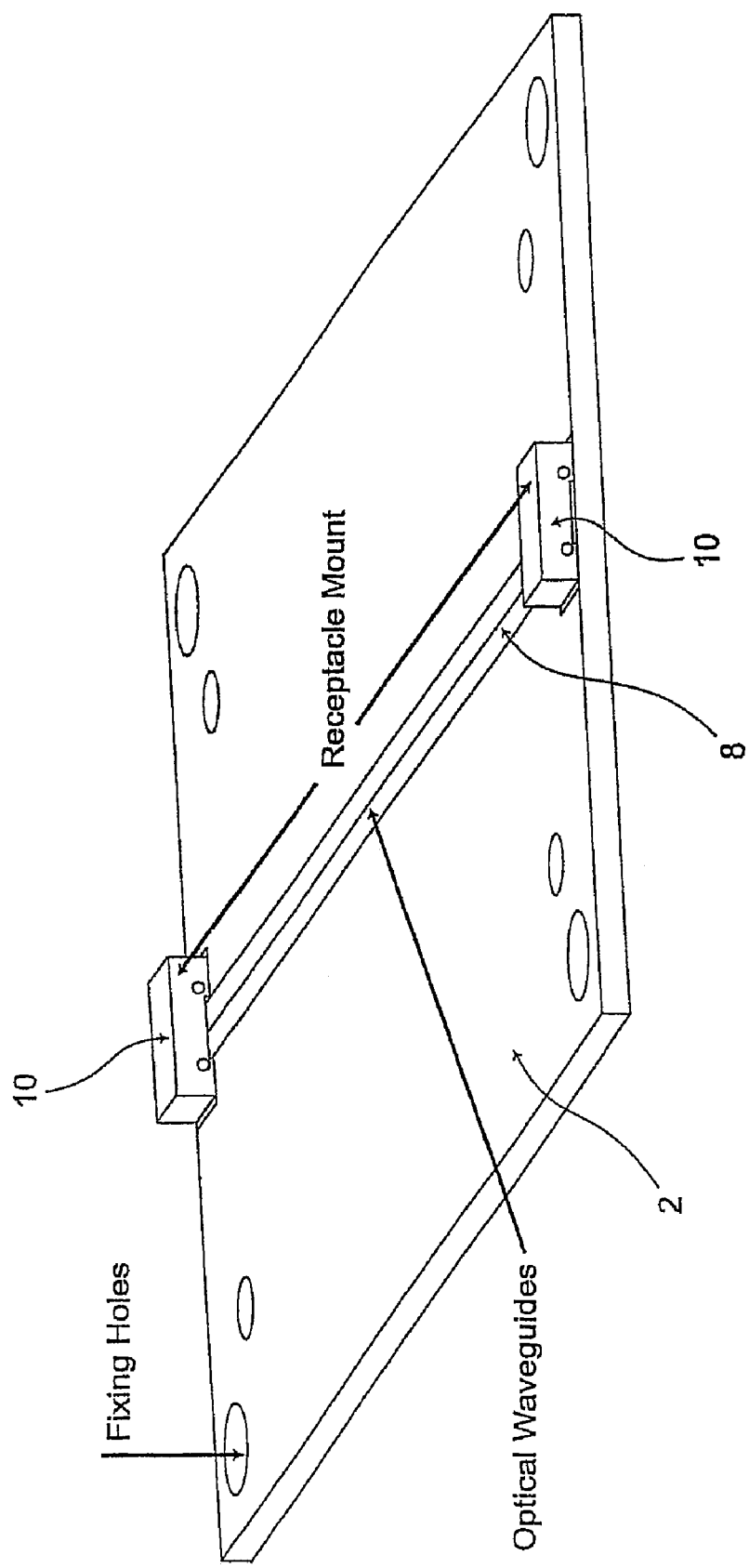
FIG. 5 is a schematic representation of an optical backplane with no user circuits connected to it.

FIG. 5 shows a schematic representation of an optical backplane 2 having two optical mounts 10 arranged thereon. One or more optical waveguides 8 such as a polymer waveguide is or are provided on the optical backplane. Any suitable type of waveguide may be used. For example, silica, glass, transparent ceramic or an optical fibre waveguide could be used. The optical mounts 10 are as described above with reference to FIGS. 1 to 4. It will be appreciated that when a first user circuit is connected to one of the optical mounts 10 shown in FIG. 5 and a second user circuit is connected to the second optical mount 10 in FIG. 5, optical communication between the two user circuits will be possible along the optical waveguides 8.

Figure 6:
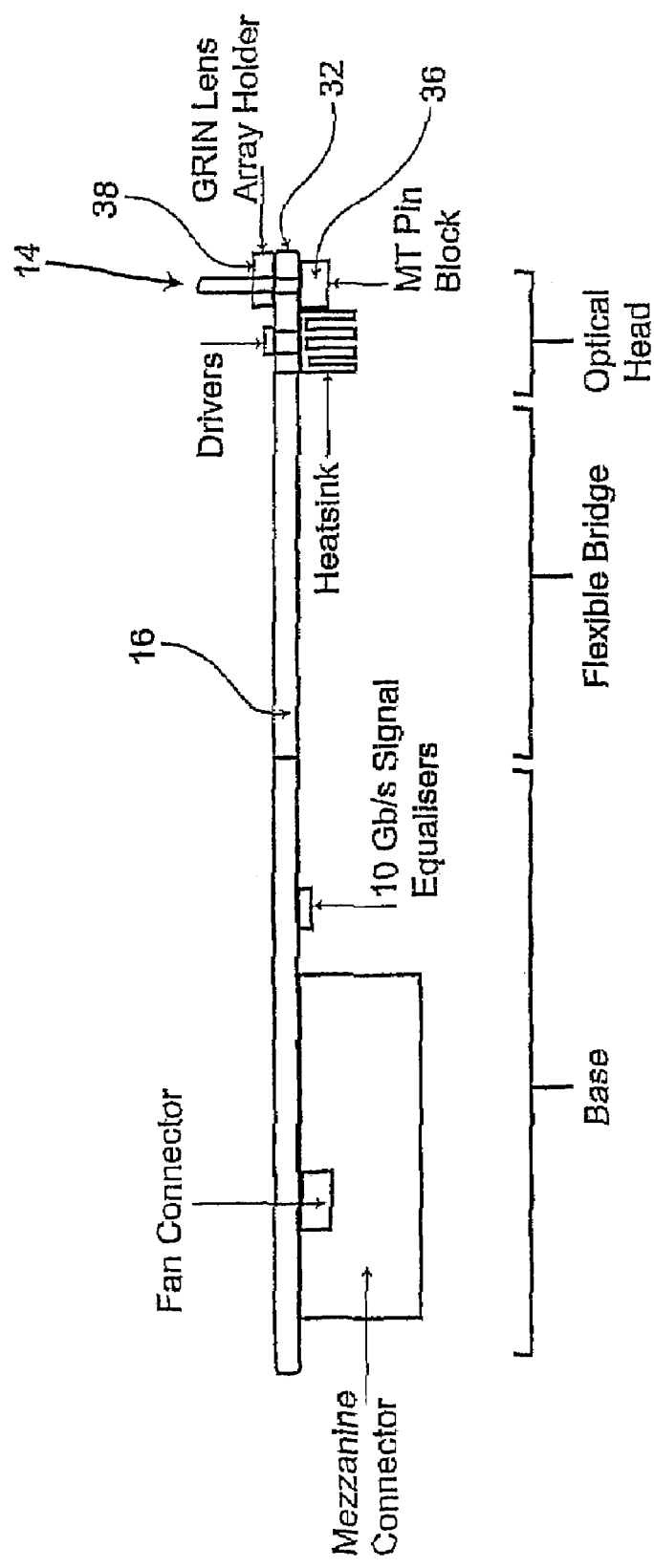
FIG. 6 shows a longitudinal cross-section through an example of a flexible circuit board suitable for use in the connector shown in and described with reference to any of FIGS. 1 to 4.

FIG. 6 shows a longitudinal cross-section through an example of a flexible circuit board suitable for use in the connector shown in and described with reference to any of FIGS. 1 to 4. The flexible circuit board 16 has mounted at one end a photonic interface unit 14. The photonic interface unit 14 includes drivers 32, a heat sink 24 and an MT pin block 36. As explained above the MT pins enable precise alignment of the photonic interface unit 14 with the waveguide or waveguides 8 on the optical backplane 2.

In the examples shown in FIG. 6, a graded index (GRIN) lens array holder 38 is provided. Within the holder 38, a number of GRIN lens are mounted. These are particularly suitable for use in the photonic interface unit. The reason that they are particularly suitable for use is that they have a substantially flat upper surface i.e. the surface opposite the surface that engages the flexible circuit board. When the connector is actually connected to an optical backplane and therefore the photonic interface unit is engaged with an optical receptacle on the backplane, the flat nature of the contact surface between the lens array and the optical receptacle and optical waveguide interface on the backplane ensures that light signals can be communicated from the connector to the backplane with little distortion. Accordingly, a GRIN lens array that effectively has a substantially flat surface that engages with the optical receptacle and optical waveguide interface is particularly suitable for use in this application. The lenses serve to image light being transmitted from the user circuit into a point on the waveguide interface and also to collimate light received from the waveguide on to the user circuit.

Figure 7:
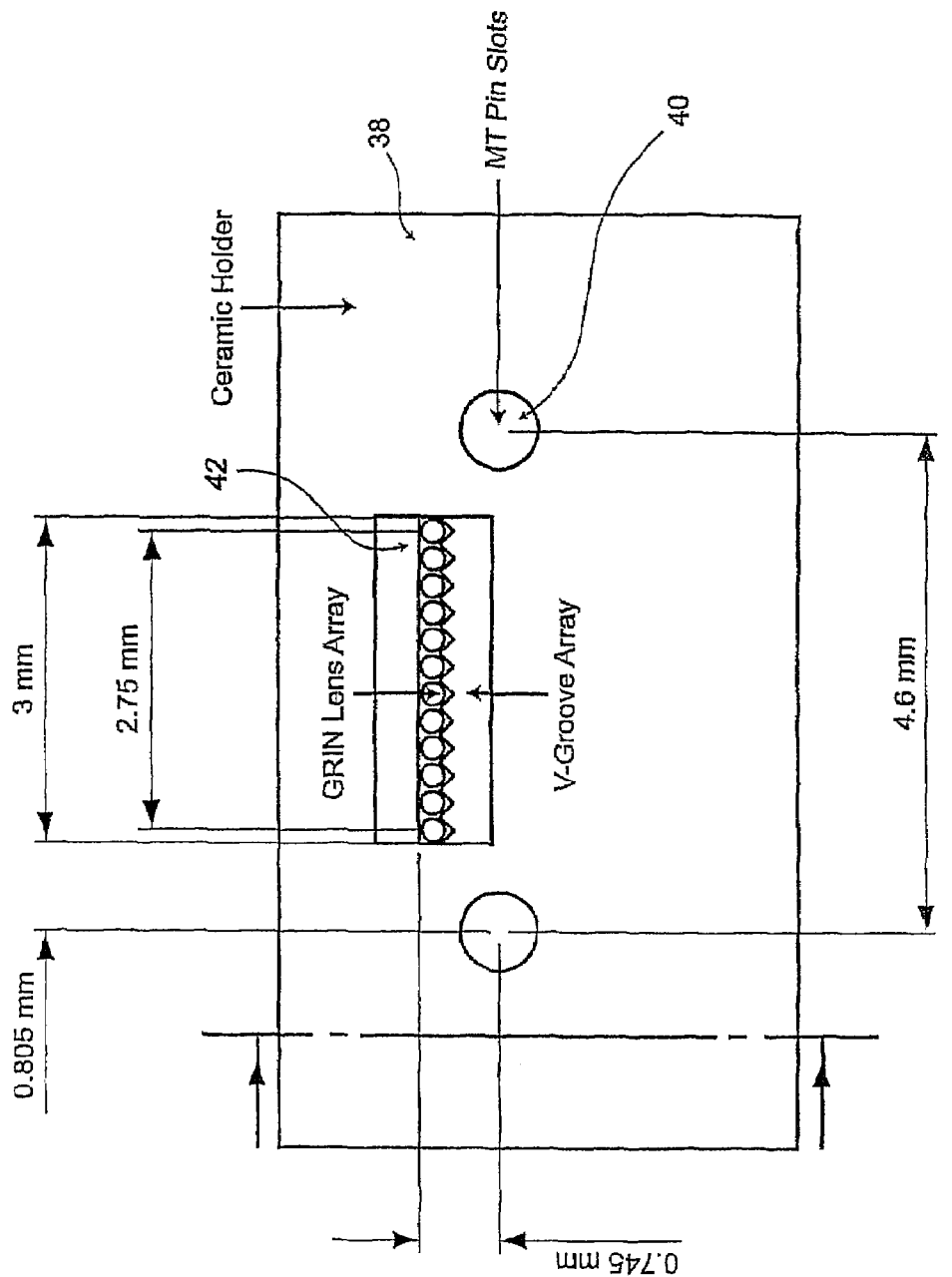
FIG. 7 shows a plan view of a schematic representation of a GRIN lens array arranged on an array holder.

FIG. 7 shows a plan view of a schematic representation of a GRIN lens array arranged on an array holder 38, in this case a ceramic holder. The photonic interface unit will also comprise one or more light sources and receivers such as VCSEL and PIN arrays. In the example shown, two slots 40 are provided for receiving the MT pins of the MT pin block 36 (not shown in FIG. 7). The GRIN lens array 42 is arranged between the MT pin slots 40.

The separation of the MT pin slots 40 is fixed at 4.6 mm to correspond with the standard separation of a pair of MT pins. The GRIN lens array 42 is off-set (in this specific example by 0.745 mm) from the centre line of the MT slots. This is selected to correspond to the off-set of the waveguides in the optical backplane to the centre line of the MT pin slots in the optical mount.

The ceramic holder 38 incorporates the slots 40 to accommodate the MT pins protruding through the flexible circuit board 16. The positional alignment of these slots 40 with respect to the lens array, correspond to the alignment of the MT pins to the VCSEL and PIN arrays, thus providing initial self-alignment of the lens array to the associated photonics. Accordingly, the arrangement shown in FIG. 7 is a particularly suitable and convenient form of lens array to use.

During passive assembly of the GRIN lenses under a microscope, a clear image of the underlying VCSEL and photodiode die is visible. Visual alignment of the centre of the lenses to the centre of the visible active areas of these die is therefore both easy and sufficiently accurate.

It will be appreciated that numerous modifications to and departures from the preferred embodiments described above will occur to those having skill in the art. Thus, it is intended that the present invention covers the modifications and variations of the invention, provided they come within that spirit and scope of the appended claims and their equivalents.

The invention claimed is:

1. An optical connector for connecting a user circuit to an optical backplane, in use the connector being adapted for mounting on a user circuit, the connector comprising:

an optical interface through which optical signals may be transmitted and received between a user circuit and a said optical backplane;
a primary aligner for engagement with a corresponding aligner on a backplane to ensure alignment of the optical interface with the backplane;
a support for supporting the aligner and/or the optical interface on the connector, the support being selected to enable relative movement between a user circuit to which the connector is connected in use and the aligner and/or the optical interface; and
a movement mechanism for urging engagement of the primary aligner on the connector with the aligner of the backplane, in which the support comprises a flexible substrate having a first end fixedly mounted to the connector and a second end movable relative to the first end and in which the movement mechanism comprises a cam movable to urge the flexible substrate into an engagement position in which, in use, the primary aligner is engaged with the corresponding aligner on the backplane.

2. An optical connector according to claim 1, in which the aligner on the connector comprises at least one projection for engagement in a socket on a backplane.

3. An optical connector according to claim 2, comprising a secondary aligner for ensuring that the primary aligner is in a position where it can be brought into registration with the corresponding aligner on the backplane.

4. An optical connector according to claim 1, wherein the optical interface includes one or more lenses for imaging or collimating light signals sent to or from the optical interface, the one or more lenses have a flat external surface.

5. An optical connector according to claim 4, wherein the one or more lenses is a graded index lens array.

6. An optical connector for connecting a user circuit to an optical backplane, in use the connector being adapted for mounting on a user circuit, the connector comprising:
an optical interface through which optical signals may be transmitted and received between a user circuit and a said optical backplane;
a primary aligner for engagement with a corresponding aligner on a backplane to ensure alignment of the optical interface with the backplane; and
a support for supporting the aligner and/or the optical interface on the connector, the support being selected to enable relative movement between a user circuit to which the connector is connected in use and the aligner and/or the optical interface,
a movement mechanism for urging engagement of the primary aligner on the connector with the aligner on the backplane,
the movement mechanism being arranged to move the primary aligner in a direction substantially perpendicular to the plane of the user circuit, and
an optical transceiver on board the connector.

7. An optical connector according to claim 6, in which the aligner on the connector comprises at least one projection for engagement in a socket on a backplane.

8. An optical connector according to claim 7, comprising a secondary aligner for ensuring that the primary aligner is in a position where it can be brought into registration with the corresponding aligner on the backplane.

9. An optical connector according to claim 6, in which the support comprises a flexible substrate having a first end fixedly mounted to the connector and a second end movable relative to the first end.

10. An optical connector according to claim 6, wherein the optical interface includes one or more lenses for imaging or collimating light signals sent to or from the optical interface, the one or more lenses have a flat external surface.

11. An optical connector according to claim 10, wherein the one or more lenses is a graded index lens array.

12. A method of connecting a user circuit to an optical backplane, the method comprising:
providing a user circuit having a connector arranged thereon, the connector being an optical connector for connecting a user circuit to an optical backplane, in use the connector being adapted for mounting on a user circuit, the connector comprising:
an optical interface through which optical signals may be transmitted and received between a user circuit and a said optical backplane;
a primary aligner for engagement with a corresponding aligner on a backplane to ensure alignment of the optical interface with the backplane;
a support for supporting the aligner and/or the optical interface on the connector, the support being selected to enable relative movement between a user circuit to which the connector is connected in use and the aligner and/or the optical interface; and
an optical transceiver on board the connector;
providing an optical backplane having one or more sockets for receiving a connector; and
engaging the connector with the socket of the backplane by inserting the connector on a user circuit into one of the sockets and urging engagement of the aligner by causing it to move in a direction substantially perpendicular to the plane of the user circuit.

13. A method according to claim 10, comprising, once the connector is engaged with the socket, activating a fixing unit to fix the connector in a fixed relationship with the backplane.

14. A method according to claim 13, wherein the step of activating a fixing unit comprises turning a cam so that the connector locks into engagement with the backplane.

15. A communication system comprising:
an optical backplane for receiving one or more user circuits for connection to the optical backplane; and,
a connector for connecting the or each user circuit to the optical backplane, wherein the connector is an optical connector for connecting a user circuit to an optical backplane, in use the connector being adapted for mounting on a user circuit, the connector comprising:
an optical interface through which optical signals may be transmitted and received between a user circuit and a said optical backplane;
a primary aligner for engagement with a corresponding aligner on a backplane to ensure alignment of the optical interface with the backplane;
a support for supporting the aligner and/or the optical interface on the connector, the support being selected to enable relative movement between a user circuit to which the connector is connected in use and the aligner and/or the optical interface,
a movement mechanism for urging engagement of the primary aligner on the connector with the aligner on the backplane,
the movement mechanism being arranged to move the primary aligner in a direction substantially perpendicular to the plane of the user circuit, and
an optical transceiver on board the connector.

* * * * *